May 12, 1964   C. J. KLISS   3,132,636
CONVERSION UNIT FOR HYDRAULIC VALVE LIFTERS
Filed Sept. 11, 1962
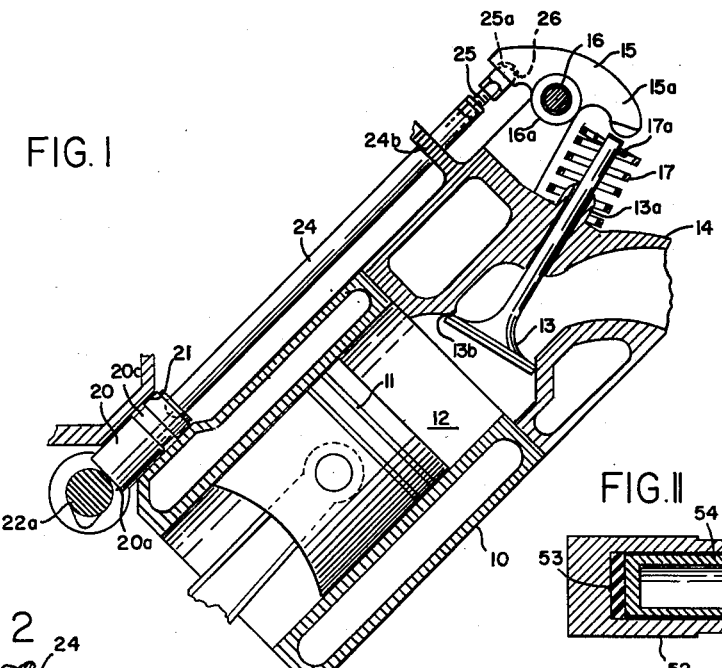
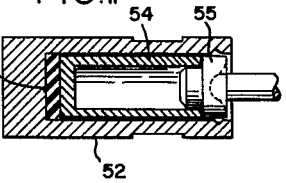
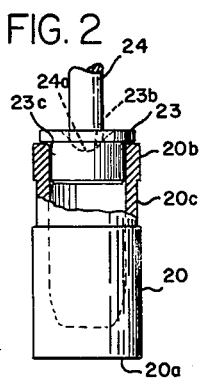
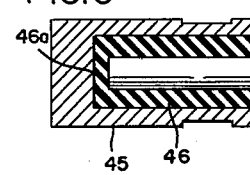
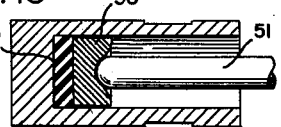
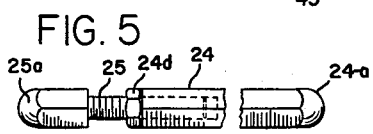
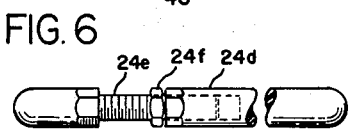
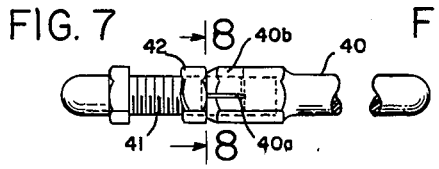
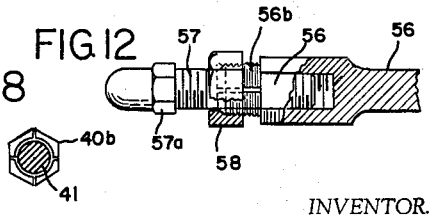
INVENTOR.
Charles J Kliss

United States Patent Office 3,132,636
Patented May 12, 1964

3,132,636
CONVERSION UNIT FOR HYDRAULIC
VALVE LIFTERS
Charles J. Kliss, 179 Palisade Ave., Garfield, N.J.
Filed Sept. 11, 1962, Ser. No. 222,849
11 Claims. (Cl. 123—90)

This invention relates to conversion units for adapting an internal combustion engine equipped with hydraulic valve lifters, by means of a conversion unit, so that the initiating and distracting noise produced by the operation of the hydraulic valve lifters may be eliminated and accurate opening and closing of the valves maintained by the use of the cylinders of the hydraulic valve lifters, in a direct mechanical pressure action, which is adjustable to take care of wear on the meeting surfaces of the working parts.

Automobiles equipped with hydraulic valve lifters rapidly become noisy and when they begin to generate distracting noises the comfort of driving an automobile is lowered and when hardened lubricating oil causes the hydraulic valve lifters to misfunction, impaired valve action can result. Many cases are known where the hardened lubrication oil actually freezes the pistons of hydraulic valve lifters, and many owners of automobiles so equipped become disgusted and trade in their automobiles or sell them outright. These facts come under my constant observation in my business of serving automobile owners and repairing faulty equipment.

The present invention is directed to a conversion unit, which includes a rod having an adjustment on its upper end for making a variable pressure contact with the valve rocker, and a thrust block disposed against its lower end, which is snugly fitted into the upper end of the cylinder of the hydraulic valve lifter, the whole unit thus providing direct mechanical pressure transfer of the motion of the valve operating cam to the valve opening rocker lever or arm, and includes, as indicated means for adjusting the relation between the rod and the rocker arm or lever.

The invention also includes means for locking the adjustable connection between the rod and the rocker arm, in any selected adjustment against accidental displacement.

With the above and other objects in view, the invention comprises certain new and useful constructions, combinations and arrangements of parts, clearly described in the following specification of the accompanying drawings, in which:

FIG. 1 is a vertical sectional view through one inclined cylinder of a group in an engine, showing the use of the conversion unit.

FIG. 2 is a side elevation of the hydraulic valve lifter cylinder, partly in section, showing one method of installing the thrust block in this cylinder, after the working parts thereof have been withdrawn.

FIG. 3 is a detail side elevation, partly in section, showing the thrust block removed from the cylinder.

FIG. 4 is a side elevation of a modified thrust block, showing a multiple diameter construction.

FIG. 5 is a side elevation of the operating rod, showing one form of adjustment thereof, broken away for convenience.

FIG. 6 is a similar view of another form of the adjustable operating rod.

FIG. 7 is a similar view of still another form of the adjustable rod.

FIG. 8 is a detail cross sectional view, taken on line 8—8 of FIG. 7, looking in the direction of the arrows.

FIG. 9 is a detail longitudinal sectional view through the cylinder, of a modified form of the invention.

FIG. 10 is a similar view through another form of the invention.

FIG. 11 is a similar view of still another form of the invention.

FIG. 12 is a side elevation, partly in section, showing another form of my invention.

Referring to the drawings, which show the practical embodiment of my invention, 10 designates an engine cylinder, in which the power piston 11 reciprocates, and above which the usual combustion chamber 12 is arranged. An overhead valve 13 is mounted to reciprocate in the engine head 14, and its stem 13a projects upwardly of the engine head 14 to engage the inner arm 15a of the rocker lever 15, which is spported by the shaft 16. A coil spring 17 encloses the valve stem 13a and engages the stop washer 17a of this stem, and acts to close the valve 13 to its seat 13b. This is old and well known construction.

In adapting my invention to an engine equipped with an hydraulic valve lifter, the conventional cylinder 20 of the hydraulic valve lifter unit is employed. This cylinder is constructed with a closed lower end 20a and an open upper end 20b, and is formed with an annular recess 20c, for lubrication purposes. This cylinder has a snug sliding fit in the guide or bore 21, formed in the engine block, so that the lower end of the cylinder 20 will engage the valve operating cam 22.

In carrying out my invention I remove the inner working parts of the cylinder 20, and insert in the upper end of this cylinder a cylindrical thrust block 23, which is formed with a circular shoulder 23a on its upper end, which engages the outer end of the guide 21. The upper end of the thrust block 23 is formed with a semi-spherical bearing or socket 23b, which is engaged by the ball shaped terminal 24a of the operating rod 24. This operating rod slides through the existing engine bearing arm 24b, and on its upper end is internally screw threaded and fitted with an adjustable rod or shaft 25, having a fine and tight mating screw thread, and is provided on its upper end with a semi-spherical thrust head 25a, which has a pressure bearing in the socket 26 of the rocker lever arm 15, which is pivotally supported at 16a on the cross bearing shaft or pin 16, which is supported on the engine. This rocker lever has the usual companion arm 15a which directly engages the rounded upper end of the valve stem 13a.

In operation, the cam 22a is rotated in timed relation to the movement of the piston 11, and as the lift or projection of the cam moves into a rising cycle, the entire cylinder 20 is pushed upwardly, thereby pushing the operating rod 24, and forcing the engaged end of the rocker lever upwardly and forcing the companion lever arm downwardly, to open the valve 13.

When wear takes place at either or both ends of the operating rod 24, manual adjustment is made by turning the adjustable shaft or rod 25 on the main operating rod, which is provided with a hexagonal head at 25c, to permit of this operation being quickly completed.

In FIG. 4 I show a base thrust block 35, having an intermediate external shoulder 35a and an upper shoulder 35b, so that different diameters of hydraulic cylinders may be fitted.

In FIG. 6 I show a push rod or operating rod 24d, having an adjustable thrust rod or shaft 24e, threaded into an internally threaded bore formed in the rod 24d, and provided with a lock nut 24f, threaded on the shank of the thrust rod 24d, to lock this rod against displacement.

In FIG. 7 I show a push or operating rod 40, enlarged at its upper end and longitudinally split at 40a, to provide a plurality of clutch jows 40b. The thrust rod 41 is threaded into this operating rod through these clutch jaws, and the nut 42 is externally threaded on these clutch jaws to close these jaws tightly on the thrust rod 41, by a mated taper fit, the outer end of the split rod 40 being slightly tapered and the nut 42 having a mating fit, so that by tightening the nut 42 on the externally threaded thrust rod 41, the jaws 40b will be locked on this rod to resist accidental displacement.

In FIG. 9 I show the use of the hydraulic cylinder 45, with a lining 46, and a thrust and push rod 47 disposed in this lining and engaging the end wall 46a thereof. This construction permits of the use of push rods of different diameters, by changing the lining used.

In FIG. 10 I show another modified form of the invention, which comprises a conventional hydraulic cylinder 48, a replaceable washer or shim 49 disposed therein, and a thrust block 50 disposed against this washer or shim, which is engaged by the push rod 51. This construction provides for a considerable take up, due to wear, and by using shims of a thickness, singly or in combination, wear on the meeting surfaces of the working parts, may be compensated for exactly, so that a silent action may be maintained. The replacements required may be made by the owner or user of the automobile or engine.

In FIG. 11 I show the use of an hydraulic cylinder 52, having a shim or washer 53 disposed therein, and a tubular lining 54, which may be the piston of the inoperative hydraulic cylinder 52, disposed within the cylinder against this shim or washer. A thrust block 55 is disposed in the outer end of the cylinder in pressure engagement with the outer end of the lining 54. This arrangement also provides for linear adjustment of the thrust block, as the thrust block may be disposed inwardly of the end of the cylinder, depending on the length of the lining, or the combined lengths of the lining and the washer or shim.

The shim or washer 53 is preferably constructed of resilient material, such as an oil proof rubber, like neoprene, which provides a slight yield when pressure is applied on the cylinder to open a closed valve. This thrust washer may be constructed of a number of thin plies or laminations, so that the total thickness may be varied to take care of any wear condition of the working faces of the conversion unit.

The cylinder shown in FIG. 9 within the main hydraulic cylinder, may also be constructed of Neoprene rubber, or similar material.

In FIG. 12 I show another form of the adjustment and locking means for the push rod and thrust rod. In this construction the outer end of the push rod 56 is formed tubular and internally screw threaded to receive the externally screw threaded thrust rod 57. The wall of this female screw part is then longitudinally slotted to provide a plurality of clutch jaws 56b, and is externally screw threaded and engaged by a nut 58, and the engaging threads are slightly tapered so the jaws 56b will be closed on the threaded thrust rod 57, and the engaged parts will be locked against accidental displacement.

It is a well known fact that the operation of hydraulic valve lifters is a major cause of interference in the use of automobiles, and especially of cars which have seen active service for a period of years. Hydraulic valve lifters depend upon the uninterrupted flow of oil, and the veins or channels which feed this oil to the hydraulic cylinders are often clogged by dirt or impurities in the oil supply. But when a car remains idle for a considerable period of time, this oil drys out and forms a film on the working surface of the cylinder and the bearing it slides through, and in many cases these cylinders are frozen to their engine bearings.

When the flow of oil to an hydraulic valve lifter is impaired or faulty, the lifting action becomes defective, and the wear on the meeting faces of the working parts is not properly compensated for by the automatic action of the valve lifter. Noisy hydraulic valve lifters force many owners to trade in or sell cars which no longer provide the comfort in traveling and the safe operation desired. When an effort is made to replace hydraulic lifters which give continued bad service, it is not always possible to secure the required mating replacements for the particular engine model, and this can result in placing a car needing such replacements idle for a long period of time.

My invention provides a prectical conversion unit or kit, which utilizes the existing engine bearings of the hydraulic lifter mechanism, and the main cylinder of the hydraulic valve lifted. By removing the internal working parts of the hydraulic lifter cylinder, connecting a push rod with this cylinder through an inserted thrust block, and adjustably connecting the push rod with the valve rocker lever, continued valve operation is provided for and maintained, at a total cost which would be a minor fraction of the high cost of replacing the hydraulic valve lifters.

Precision fitting is made possible by the locked adjustment of the thrust rod in the push rod, and in this way an owner can by his own skill and labor replace noisy hydraulic valve lifters with adjustable push rods, which transfer the timed action of the valve cams to the valve lifting levers, in complete silence.

It is understood that various changes and adjustments may be carried out, with in the scope of the claims hereof, which define the invention herein disclosed.

Having described my invention I claim as patentable:

1. A conversion unit for a defective hydraulic valve lifter, comprising the combination, for use with the cylinder of the hydraulic valve lifter and a roker lever of an engine valve, of: a thrust block disposed in pressure engagement in the cylinder and provided with a socket therein, and a push rod having a bearing in said socket and provided with a thrust rod adjustably mounted thereon for engagement with the rocker lever of the engine valve.

2. A conversion unit for a defective hydraulic valve lifter, comprising the combination, for use with the cylinder of the hydrauic valve lifter to be converted and a rocker lever of an engine valve, of: a thrust block disposed in the cylinder in pressure engagement with the end of the cylinder, the outer end of the thrust block bbeing provided with a central bearing socket, a push rod engaged at its lower end with said socket and provided with an internally screw threaded outer end, and an externally screw threaded thrust rod adjustably threaded in said internal screw thread for engagement with the rocker lever.

3. The combination with an internal combustion engine having a valve equipped with a stem, a spring for closing the valve, a rocker lever for opening the valve, a bearing through which the cylinder of an hydraulic valve lifter works and an hydraulic cylinder of such lifter having its own internal working parts removed therefrom of: a thrust block having pressure engagement with the cylinder and providing a central bearing socket, a push rod having sliding engagement with the engine and its lower end in pressure engagement with the socket of the thrust block, a thrust rod fitted in the upper end of the push rod and having pressure engagement with the rocker lever, and means for adjusting the linear relation of the thrust rod to the push rod to maintain a noise free operating connection between the cylinder and the rocker lever.

4. A conversion unit, for a defective hydraulic valve lifter of the type wherein a hydraulic cylinder forms part of the train intended to activate a rocker lever, comprising: a thrust block for engaging an inoperative hydraulic cylinder and a push rod cooperating with said thrust block and having a bearing at the end away from the thrust block for engaging a rocker lever; the construction being such that the conversion unit can be utilized in combination with an inoperative original hydraulic cylinder to provide a non-hydraulic valve train.

5. A conversion unit, for a defective hydraulic valve lifter of the type wherein a hydraulic cylinder forms part of the train intended to activate a rocker lever, comprising: a thrust block for engaging an inoperative hydraulic cylinder; and a push rod having a bearing at one end for cooperation with said thrust block and a bearing at the other end for engaging a rocker lever; the construction being such that the conversion unit can be utilized in combination with an inoperative original hydraulic cylinder to provide a non-hydraulic valve train.

6. A conversion unit, for a defective hydraulic valve lifter of the type wherein a hydraulic cylinder forms part of the train intended to activate a rocker lever, comprising: a thrust block for engaging an inoperative hydraulic cylinder; and a push rod having a bearing at one end for cooperation with said thrust block and a thrust rod adjustably mounted at the other end for engaging a rocker lever; the construction being such that the conversion unit can be utilized in combination with an inoperative original hydraulic cylinder to provide a non-hydraulic valve train which is adjustable.

7. A conversion unit in accordance with claim 6, wherein: the thrust block has a cylindrical portion for insertion into the inoperative hydraulic cylinder and a shoulder for engaging the upper end of the hydraulic cylinder.

8. A conversion unit in accordance with claim 6, wherein: the thrust rod is adjustably threaded into an internally threaded opening in the end of the push rod; and the thrust rod carries a nut which can be tightened against the internally threaded end of the push rod to maintain desired adjustment of the thrust rod.

9. A conversion unit in accordance with claim 6, wherein: the thrust rod is adjustably threaded into an internally threaded opening in the end of the push rod; the internally threaded end of the push rod is longitudinally split to provide a plurality of jaws which are externally threaded to carry a nut; and the nut can be adjusted to cause compression of the jaws against the thrust rod to maintain desired adjustment of the thrust rod.

10. A conversion unit in accordance with claim 6, which also includes: a semi-elastic shim for insertion into an inoperative hydraulic cylinder to support the thrust block.

11. A conversion unit in accordance with claim 10, which also includes: a lining for insertion into an inoperative hydraulic cylinder between the shim and the thrust block; so that the thrust block contacts one end of the lining, the other end of the lining contacts the shim, and the shim contacts the closed end of the hydraulic cylinder.

References Cited in the file of this patent

UNITED STATES PATENTS

| | | |
|---|---|---|
| 976,274 | McHardy | Nov. 22, 1910 |
| 2,819,705 | Dickson | Jan. 14, 1958 |
| 2,878,795 | Mannerstedt | Mar. 24, 1959 |
| 3,038,459 | Schmid | June 12, 1962 |